US011552893B2

(12) United States Patent
Dave et al.

(10) Patent No.: US 11,552,893 B2
(45) Date of Patent: Jan. 10, 2023

(54) END-TO-END FLOW MONITORING IN A COMPUTER NETWORK

(71) Applicant: Juniper Networks, Inc., Sunnyvale, CA (US)

(72) Inventors: Hiren Bhalchandra Dave, Fremont, CA (US); Ashok Patrick Jude Manoharan, Pleasanton, CA (US); Vikram P. Rautela, Morgan Hill, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/103,610

(22) Filed: Nov. 24, 2020

(65) Prior Publication Data

US 2022/0166722 A1    May 26, 2022

(51) Int. Cl.
*H04L 47/10* (2022.01)
*H04L 69/22* (2022.01)

(52) U.S. Cl.
CPC .............. *H04L 47/18* (2013.01); *H04L 69/22* (2013.01)

(58) Field of Classification Search
CPC ................................. H04L 47/18; H04L 69/22
See application file for complete search history.

(56) References Cited

U.S. PATENT DOCUMENTS

| 9,178,810 | B1* | 11/2015 | Singh ....................... H04L 69/22 |
| 2007/0258372 | A1 | 11/2007 | Nadeau et al. |
| 2017/0063783 | A1* | 3/2017 | Yong ........................ H04L 67/10 |
| 2020/0366578 | A1 | 11/2020 | Punj et al. |
| 2021/0111992 | A1* | 4/2021 | Nainar ..................... H04L 43/12 |

OTHER PUBLICATIONS

RFC 6790, Nov. 2012, IETF.*
Kompella et al. "The Use of Entropy Labels in MPLS Forwarding" Internet Engineering Task Force (IETF), RFC 6790, Nov. 2012, 25 pgs.
Andersson et al. "LDP Specification" Network Working Group, RFC 5036, Oct. 2007, 135 pp.
Awduche et al. "RSVP-TE: Extensions to RSVP for LSP Tunnels," Network Working Group, RFC 3209, Dec. 2001, 61 pp.

(Continued)

*Primary Examiner* — Jae Y Lee
(74) *Attorney, Agent, or Firm* — Shumaker & Sieffert, P.A.

(57) ABSTRACT

In this disclosure, in a network comprising a plurality of network devices, a network device includes processing circuitry configured to: receive packet data corresponding to a network flow originating at a first device, the packet data destined to a second device; generate an entropy label to add to a label stack of the packet data, wherein the entropy label is generated from one or more attributes corresponding to the network flow that originated at the first device and is destined to the second device; generate a flow record including the entropy label, wherein the entropy label identifies the network flow amongst a plurality of network flows in the network; and send, to a controller of the network, the flow record, wherein the controller identifies the flow record based on the entropy label corresponding to the network flow originating at the first device and is destined to the second device.

20 Claims, 8 Drawing Sheets

(56) References Cited

OTHER PUBLICATIONS

Farrel et al. "Inter-Domain MPLS and GMPLS Traffic Engineering—Resource Reservation Protocol-Traffic Engineering (RSVP-TE) Extensions" Network Working Group, RFC 5151, Feb. 2008, 25 pp.
Filsfils et al. "Segment Routing Architecture" Internet Engineering Task Force (IETF), RFC 8402, Jul. 2018, 33 pp.
Filsfils et al. "Segment Routing Use Cases" draft-filsfils-spring-segment-routing-use-cases-01, Network Working Group, Internet-Draft, Jul. 14, 2013, 46 pp.
Filsfils et al., "Segment Routing Architecture," Network Working Group, draft-filsfils-spring-segment-routing-04, Jul. 3, 2014, 18 pp.
Previdi et al., "Source Packet Routing in Networking (SPRING) Problem Statement and Requirements," RFC 7855, Internet Engineering Task Force (IETF), May 2016, 19 pp.
Filsfils et al., "Segment Routing with MPLS data plane" draft-filsfils-spring-segment-routing-mpls-03, Internet-Draft, Network Working Group, Jul. 31, 2014, 14 pp.
Extended Search Report from counterpart European Application No. 21155805.1, dated Jul. 30, 2021, 18 pp.
Kompella et al. "The Use of Entropy Labels in MPLS Forwarding; draft-ietf-mpls-entropy-label-06," Network Working Group; Internet-Draft, Sep. 6, 2012, 23 pp.
Fatemipour et al., "Design and Implementation of a Monitoring System Based on IPFIX Protocol," IEEE, The Third Advanced International Conference on Telecommunications (AICT'07), May 13-19, 2007, 6 pp.

\* cited by examiner

END-TO-END FLOW MONITORING IN A COMPUTER NETWORK

TECHNICAL FIELD

The disclosure relates to computer network monitoring and, in particular, to end-to-end flow monitoring in a computer network.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form.

Certain devices (i.e., nodes), such as routers, maintain routing information that describes routes through the network. A "route" can generally be defined as a path between two locations on the network. Upon receiving an incoming packet, the router examines keying information within the packet to identify the destination for the packet. Based on the destination, the router forwards the packet in accordance with the routing information.

Packet-based networks increasingly utilize label switching protocols for traffic engineering and other purposes. Multi-protocol label switching (MPLS) is a mechanism used to engineer traffic patterns within Internet protocol (IP) networks according to the routing information maintained by the routers in the networks. By utilizing MPLS protocols, label switching routers (LSRs) can forward traffic along a particular path, i.e., a label switched path (LSP), through a network to a destination device using labels prepended to the traffic. An LSP defines a distinct path through the network to carry MPLS packets from the source device to a destination device.

SUMMARY

In general, the disclosure describes techniques that enable end-to-end flow monitoring in a computer network using entropy labels. To illustrate by way of an example computer network, an MPLS network may perform label allocation involving load balancing decisions and assign an entropy label (e.g., a hash value) to ensure that the packet data of a same network flow is forwarded along the same path among a plurality of paths as outlined in K. Kompella et al., "The Use of Entropy Labels in MPLS Forwarding," RFC 6790, November 2012, available at http://tools.ietf.org/html/rfc6790, which is hereby incorporated by reference (referred to herein as "RFC 6790"). For example, an ingress router may determine the network flow (e.g., the application to which the packet belongs) of an incoming packet, and captures the flow information in an entropy label. Transit routers may use the entropy label to perform load balancing to ensure packet data is load balanced on the same path across multiple paths.

In accordance with the techniques described herein, a network controller may employ the entropy label as an index for network flow information stored in a data structure (e.g., a database). Because the labels allocated in MPLS networks are unique, some techniques leverage that quality to use the entropy labels as keys to monitor and track specific network flows.

Some techniques described herein are implemented in one or more of a number of routers that forward packet data along the computer network. Each router may be configured to repurpose entropy labels for end-to-end network flow monitoring. For example, an ingress router may export key information for computing the entropy label, which enables the network controller to distinguish between network flows. When packet data having the entropy label is received, each router in the MPLS network may generate a flow record to include the entropy label (as a primary key) and any useful information associated with the flow. By doing so, each router may be triggered by the entropy label into exporting, to the network controller, their flow record using the entropy label as the record's index key. The network controller may collect (e.g., and coalesce) the flow records from each router and continue to use the same entropy label as the key for those flow records. The network controller may use the flow record associated with a given entropy label to detect failures in the network flow. For example, if the network flow is down, the network controller may identify the routers that previously exported the flow record having the entropy label and identify which of those routers did not currently export the flow record.

The present disclosure sets forth, in the following description, an improvement to the functioning of computer networks and the techniques described herein integrate that improvement into practical applications. The following description (e.g., including the following examples) disclose additional details for the network devices (e.g., routers) and the network controller and their repurposing of entropy labels for end-to-end flow monitoring. As described herein, the network controller benefits from enabling end-to-end flow monitoring by using entropy labels as index keys for identifying corresponding network flows. Moreover, network devices (e.g. routers including the transit routers) benefit from a reduction in packet processing tasks as the use of entropy labels eliminates the need for deep packet inspection to identify the network flows.

In one example network comprising a plurality of network devices, a network device includes processing circuitry configured to: receive packet data corresponding to a network flow originating at a first device, the packet data destined to a second device; generate an entropy label to add to a label stack of the packet data, wherein the entropy label is generated from one or more attributes corresponding to the network flow that originated at the first device and is destined to the second device; generate a flow record including the entropy label, wherein the entropy label identifies the network flow amongst a plurality of network flows in the network; and send, to a controller of the network, the flow record, wherein the controller identifies the flow record based on the entropy label corresponding to the network flow originating at the first device and is destined to the second device.

In another network comprising a plurality of network devices, a network device includes processing circuitry configured to: receive packet data corresponding to a network flow originating at a first device and is destined to a second device in the network, the packet data comprising an entropy label for the network flow and a label stack for directing the packet data to the second device through at least one of the plurality of network devices; generate a flow record including the entropy label, wherein the label stack of the packet data comprises the entropy label to identify the network flow amongst a plurality of network flows in the network; and send, to a controller of the network, the flow record, wherein the controller identifies the flow record based on the entropy label for the network flow originating at the first device and is destined to the second device.

In another network comprising a plurality of network devices, a controller includes processing circuitry configured to: maintain an index storing an arrangement of flow records for a plurality of network flows through the network, wherein for one or more corresponding flow records of a particular network flow of the plurality of network flows, an index key is based on an entropy label corresponding to the particular network flow, wherein each of a plurality of entropy labels identifies a respective one of the plurality of network flows; receive, from a network device in the network, one or more attributes corresponding to a new entropy label for packet data of a new network flow in the network, wherein the new entropy label identifies flow records for the new network flow; and generate, based on the new entropy label, a new index key for each flow record corresponding to the new network flow to be added to the index.

The details of one or more examples are set forth in the accompanying drawings and the description below. Other features, objects, and advantages will be apparent from the description and drawings, and from the claims.

DETAILED DESCRIPTION

Figure 1:
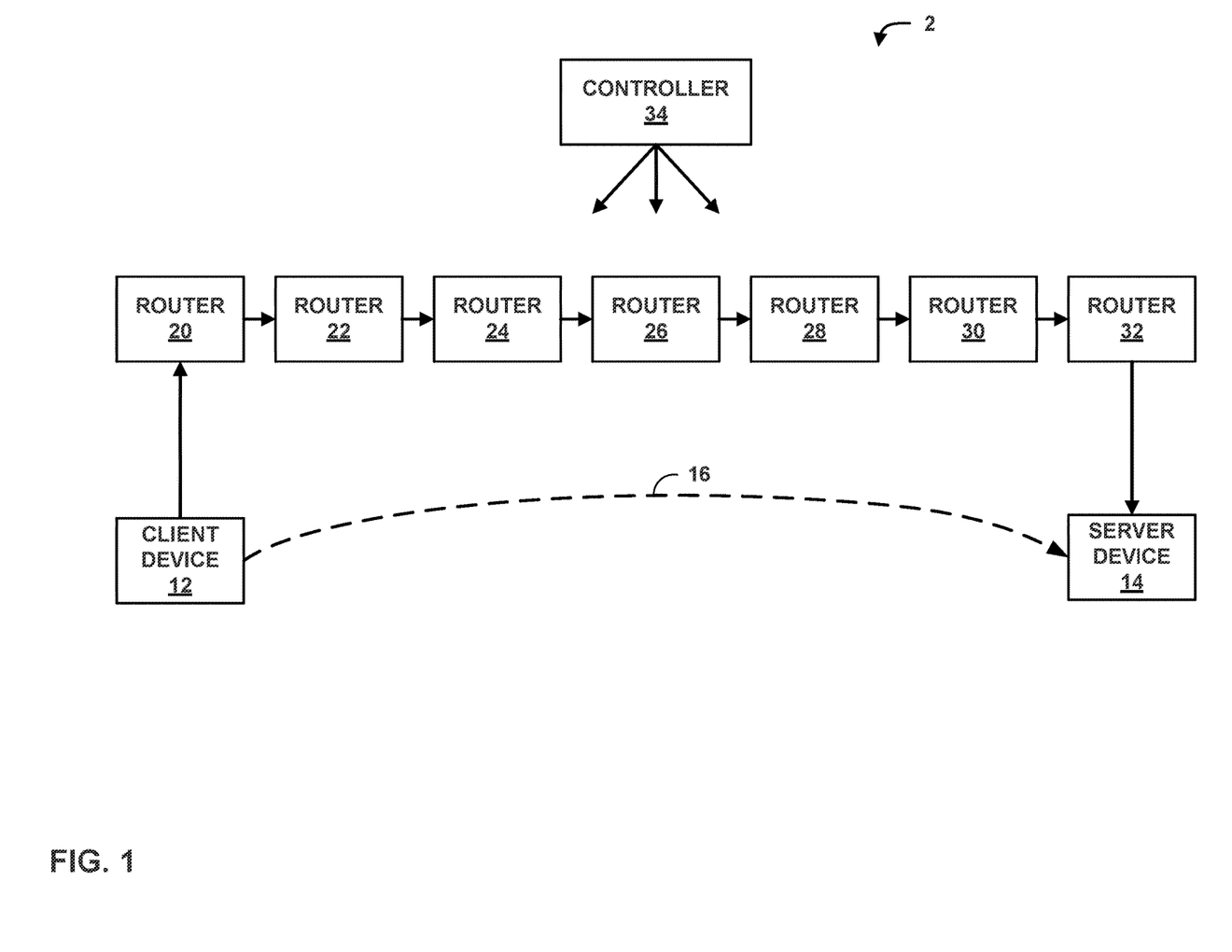
FIG. 1 is a block diagram illustrating an example system in which client device sends data to server device with end-to-end flow monitoring on a label-switched path (LSP).

FIG. 1 is a block diagram illustrating an example system 2 in which client device 12 sends data to server device 14 with end-to-end flow monitoring on a label-switched path (LSP) 16. LSP 16 (which may be herein referred to a tunnel or LSP tunnel) is formed by routers 20-32, in this example, although it should be understood that fewer or additional network devices (not shown in FIG. 1) may form LSP 16. In this example, routers 20-32 are label switching routers (LSRs) along LSP 16. Routers 20-32 execute protocols for establishing paths, such as LSP 16. Such protocols may include, for example, link distribution protocol (LDP) or resource reservation protocol with traffic engineering extensions (RSVP-TE). LDP is described by "LDP Specification," L. Andersson et al., Network Working Group, RFC 5036, October 2007, which is hereby incorporated by reference in its entirety. RSVP-TE is described by "RSVP-TE: Extensions to RSVP for LSP Tunnels," D. Awduche et al., Network Working Group, RFC 3209, December 2001, which is updated by "Inter-Domain MPLS and GMPLS Traffic Engineering-Resource Reservation Protocol-Traffic Engineering (RSVP-TE) Extensions," A. Farrel et al., Network Working Group, RFC 5151, February 2009, which are both hereby incorporated by reference in their respective entireties. In some examples, routers 20-32 may use segment routing techniques, such as by using a Source Packet Routing in Networking (SPRING) paradigm, that provides segment routing to advertise single or multi-hop LSPs. Segment routing is further described in Filsfils et al., "Segment Routing Architecture," Internet Engineering Task Force (IETF), Request for Comments (RFC) 8402, July 2018, while Segment Routing use cases are described in Filsfils et al., "Segment Routing Use Cases," Internet-Draft-draft-filsfils-rtgwg-segment-routing-use-cases-01, July 2013, the entire contents of each of which are incorporated herein by reference. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 2016; (3) "Segment Routing with MPLS data plane," IETF draft: draft-filsfils-spring-segment-routing-mpls-03, Aug. 1, 2014, the entire contents of each of which is incorporated by reference herein.

In general, packets directed along LSP 16 are encapsulated by one or more labels in a label stack, e.g., in accordance with Multi-Protocol Label Switching (MPLS). In this manner, to direct traffic along an LSP, a router along the LSP may use a label of the label stack of a received packet to determine the "next hop" for the packet, that is, the next network device to which to forward the packet. In addition, the router may pop one or more labels from the label stack and push a new label onto the label stack, which causes the next hop to direct the packet along the LSP.

Although LSP 16 of FIG. 1 is shown as corresponding to routers 20-32 in FIG. 1, in some examples, an LSP may be implemented using various, different sets of routers (not shown), e.g., to achieve load balancing. Rather than directing all traffic of client device 12 along routers 20-32, a load balancing algorithm, such as equal-cost multipath (ECMP) may be used to distribute the traffic among different sets of devices that, ultimately, achieve the result of directing all traffic from client device 12 to server device 14.

In general, when determining which of the sets of devices to direct traffic along to reach server device 14 when using a load-balancing algorithm (e.g., a mathematical function), a routing device computes a hash of the label stack of packets of the traffic. Assuming that two or more client devices are using the same path, however, the label stack will be the same for each client device. Therefore, RFC 6790 proposed adding an entropy label into the label stack. The entropy label may be distinct for a particular packet flow directed along LSP tunnel 16, such that a hash performed on the label stack for each packet of the packet flow will be directed along the same set of devices for the LSP, which may avoid out-of-order delivery for packets of the packet flow, but still allow for load balancing of different flows from the same client device.

RFC 6790 is directed to using entropy labels when load balancing traffic for a single LSP. That is, devices along a single LSP may use the entropy label, and the last or penultimate router of the LSP is expected to remove the entropy label before forwarding the packet beyond the LSP.

However, this disclosure recognizes that entropy labels can be repurposed for end-to-end flow monitoring for the LSP.

Devices, systems, and techniques described herein repurpose entropy labels, for example, as an index for enabling end-to-end flow monitoring. The term "packet flow," "traffic flow," or simply "flow" refers to a set of packets originating from a particular source device and sent to a particular destination device. A single flow of packets, in either an upstream (sourced by client device 12) or downstream (destined for one of client devices 12) direction, may be identified by attributes of a packet header, referred to as 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port>, or any other combination of attributes in the packet header. A common example of a flow is a TCP session. Other examples are a Layer 2 Tunneling Protocol (L2TP) session corresponding to a given broadband user or traffic within an ATM virtual circuit. Some example devices, systems, and techniques are implemented in one or more of a number of routers that forward the packet data along the computer network. Other examples are implemented in a controller for the computer network.

Conventional networks may define templates specifying an exporting format for different routers to use when exporting flow records to a network controller. When such a network implements passive flow monitoring and/or active flow monitoring, a router may monitor the traffic flow and export flow information in a format defined by the template to the network controller. For example, the router may typically generate a flow record having information about the following fields: source and destination IP address; total number of bytes and packets sent; start and end times of the data flow; source and destination port numbers; TCP flags; IP protocol and IP type of service; originating Autonomous System of source and destination address; source and destination address prefix mask lengths; next-hop router's IP address; and MPLS label(s).

In a conventional network, each router may index a flow record using a set of multiple hash keys defined by, for example, the above-mentioned 5-tuple but, due to the number of the multiple keys, it may be computationally expensive to index the flow record. In addition, for a single flow, the controller may receive different sets of multiple keys from the different routers, convoluting the identification of flow record for that flow. Moreover, MPLS encapsulation may, in many cases, require a fairly deep inspection of packets (referred to as "deep packet inspection") to find these keys, which is a complex key-search mechanism requiring additional processing.

For tunneled flows (e.g., MPLS over Generic Routing Encapsulation (GRE)), transit routers are unable to export flow records with application identifiers. For segment routing where the LSP is partitioned into segments, when routers using slice segment IDs (SIDs) to identify egress routers of each segment, the same slice SIDs are not configured to identify an application corresponding to the flow. Some conventional techniques implement network probing where the controller may send probes to determine issues within routers in the MPLS network but are unable to determine which application is affected in performance. Even when the probes clone application packet headers, the probes cannot identify which flows correspond to a particular application.

Because the entropy label, which may be generated from one or more attributes of a packet header, directs the network device to load balance each packet of the network flow along a same sequence of routers, the same entropy label may be used to index the flow records of the network flow. As described herein, controller 34 benefits from enabling end-to-end flow monitoring by using entropy labels as index keys for identifying corresponding network flows. The techniques described herein may provide for less complex transit routers with reduced processing tasks, enabling scalability to higher forwarding rates, larger port density, lower power consumption, among other benefits and improvements.

For example, rather than exporting a flow record identified by multiple keys, transit routers may instead export a flow record including an entropy label associated with the packet flow to controller 34. Not only do conventional transit routers use a considerable number of attributes to generate the flow record's index key, the conventional transit routers must inspect the packet data to some non-trivial degree. In contrast, for transit routers of a same or similar structure, the techniques described herein enable flow record generation and exportation without a non-trivial inspection. Instead of independently computing the flow record's index key using the same set of multiple keys used by the ingress router in the same LSP 16 or a different set of multiple keys, the transit routers export (as at least a portion of the flow record), for example, the packet's label stack (e.g., tunnel labels and/or application labels) with little or no processing of the packet data. The transit routers described herein are not required to independently compute a copy of the same entropy label on the packet's label stack and, in some examples, may rely on the entropy label in the label stack as an accurate index key for the packet's corresponding network flow.

Thus, routers 20-32 also benefit from the techniques described herein because there will be no reason to implement a complex key-search mechanism to identify a given packet flow and to export such information to controller 34. For example, in response to receiving packet data including an entropy label, the router of routers 20-32 receiving the packet may be triggered by the entropy label into exporting, to controller 34, its flow record using the entropy label as the record's index key. Moreover, an egress router may exhibit a higher edge-service velocity.

Controller 34 may leverage entropy labels for a simple and immediate identification process for incoming flow records. When controller 34 receives a flow record with an entropy label, controller 34 (in turn) benefits from the corresponding entropy label being the flow record's index key by using the entropy label to quickly identify other corresponding network flow information including other flow records (e.g., downstream flow records) exported by one or more of routers 20-32 of an end-to-end path (e.g., LSP 16) in the computer network. Controller 34 may quickly access these records to generate and analyze network flow statistics and/or determine errors in the network flow or the end-to-end path for the packet. For example, if any of routers 20-32 (e.g., the transit router, PHP router, and/or egress router) does not provide the flow record associated with the network flow's given entropy label, controller 34 may determine that router to be down or to have an error. Controller 34 may further determine that the entire path (and possibly LSP 16 in its entirety) is down or has an error.

To illustrate by way of an example, at least two of routers 20-32 form an MPLS network that performs label allocation (which may or may not involve any load balancing decisions) employing an entropy label as an index for network flow information stored in a data structure (e.g., database).

Depending upon the role, routers in the MPLS network may perform operations that either differ from or add to conventional functionality for entropy labels (e.g., as outlined in RFC 6790). For instance, an ingress router (e.g., router 20) communicates to controller 34 key information used to compute the entropy label, which enables controller 34 to distinguish between network flows. The key information specifies attributes for computing for the entropy label. For example, an entropy label may be generated based on attributes of a packet header, such as a 5-tuple. In this manner, the controller 34 may use the entropy label to distinguish between different network flows and identify network flow records received from routers along the path corresponding to the same network flow.

When a router (e.g., transit router, penultimate router) receives the packet data including the entropy label, the entropy label functions as a trigger for the receiving router to generate a flow record to include, for example, the following: the entropy label (as a primary key to identify the flow record); a protocol, an outgoing interface, and information associated with the packet flow. Example information associated with the packet flow may include MPLS header information (e.g., labels including tunnel label, application-specific label, etc.) and other information in the label stack. The router then sends the flow record and the entropy label to controller 34.

Controller 34 may advantageously leverage the entropy label to determine errors in the network flow and/or in any of routers 20-32. Controller 34 may manage a database of flow records that routers 20-32 exported in response to receiving packets with entropy labels. For each exported flow record that is received, controller 34 may utilize the record's entropy label to arrange (e.g., index) that flow record in the database and/or identify (e.g., index) any related flow record within the database. Controller 34 may use the flow record's entropy label to identify other flow records and the routers that exported the flow records for a same network flow. It should be noted that controller 34 is able use the entropy label as a simple mechanism to quickly identify which network flow corresponds to a given flow record. However, if controller 34 stops receiving flow records for a particular network flow, controller 34 may generate data indicating that the particular network flow and/or one or more routers 20-32 may be offline and/or malfunctioning, for example, in response to determining that packets for the particular network flow did not reach a destined transit, PHP, and/or egress router in LSP 16. Without consuming substantial resource capacities and/or capabilities (e.g., memory), controller 34 may determine errors in the network flow and/or in any of routers 20-32.

Controller 34 detects a failure, for example, when an incoming flow record does not indicate a conversion from a layer 2 protocol to a layer 3 protocol (or simply a layer 3 protocol). While some flow record formats may utilize different words for a same attribute field, a number of flow record formats implement an outgoing protocol field. For such flow record formats, controller 34 identifies a failed network flow if the outgoing protocol field includes corrupted, erroneous, or null data. Consider an example where controller 34 receives, from an ingress router of LSP 16, a flow record with an entropy label that identifies a particular flow and an outgoing protocol field indicating an conversion from an incoming layer 3 protocol (e.g., IP) to a layer 2 protocol (e.g., MPLS); processing circuitry within controller 34 is configured to expect, from a corresponding egress router, a flow record having the same entropy label and an outgoing protocol of the incoming layer 2 protocol to any layer 3 protocol (e.g., IP or another protocol). If, however, controller 34 receives a flow record with the same entropy label but without the expected outgoing protocol, then controller 34 determines the particular flow is broken. By including the entropy label in the flow record (e.g., as an index key), the techniques described herein confer controller 34 with visibility into a given flow's path through routers 20-32 of LSP 16. Controller 34 may arrange flow records in a flow record database according to the entropy label and by doing so, may reconstruct the given flow's (partial) path starting at an ingress router. Narrowing down routers 20-32 to a last router (e.g., an egress router such as router 32) to process packets for that given flow enables controller 34 to quickly identify certain noteworthy details at the moment of failure. Controller 34 may determine that the failure resulted from errors (e.g., mechanical errors) on an outgoing interface (e.g., a media interface, such as Asynchronous Transfer Mode (ATM) or Ethernet) by identifying the outgoing interface from the flow record(s) of the last router and detecting these errors on that interface.

The devices, systems, and techniques described herein provide a solution where the entropy label is repurposed for not only identifying the application corresponding to the flow but also individual network flows.

Figure 2:
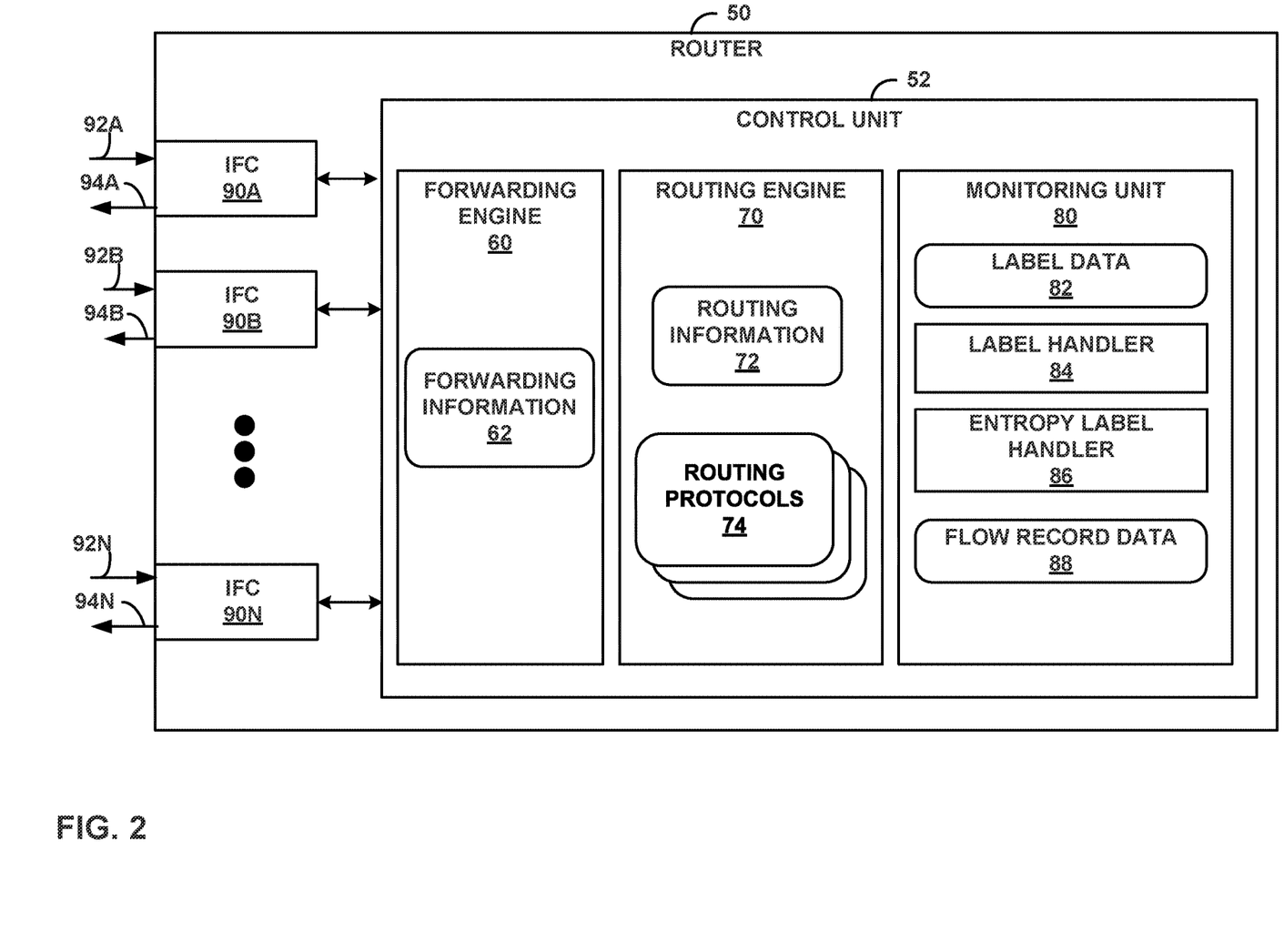
FIG. 2 is a block diagram illustrating an example router including a monitoring unit configured according to the techniques of this disclosure.

FIG. 2 is a block diagram illustrating an example router 50 including a monitoring unit 80 configured according to the techniques of this disclosure. Router 50 may correspond to an ingress router, a transit router, a penultimate router, or an egress router, e.g., one of routers 20, 24, 28, and 32 in FIG. 1. In the example of FIG. 2, router 50 includes interface cards 90A-90N (IFCs 90), and control unit 52. Control unit 52 includes packet forwarding engine (PFE) 60, routing engine (RE) 70, and monitoring unit 80.

IFCs 90 receive data via respective inbound links 92A-92N (inbound links 92) and send data via outbound links 94A-94N (outbound links 94). Inbound links 92 and outbound links 94 in some examples form common, physical communication media for the IFCs, which operate in full duplex mode. That is, in some examples, each of IFCs 90 are coupled to respective communication media that can send and receive data substantially simultaneously. In other examples, inbound links 92 and outbound links 94 form separate physical media for respective IFCs 90.

Control unit 52 includes processing hardware and, in some examples, software and/or firmware executed by the processing hardware. In various examples, control unit 52 and the various elements thereof, e.g., PFE 60 and RE 70, are implemented in one or more processors, processing units, digital signal processors (DSPs), application specific integrated circuits (ASICs), field programmable gate arrays (FPGAs), or any combination thereof. When implemented in software or firmware, control unit 52 includes one or more processors or processing units for executing instructions for the software or firmware, as well as a computer-readable storage medium for storing the instructions. In some examples, elements of PFE 60 and RE 70 are implemented in discrete units or modules, while in other examples, PFE 60 and RE 70 are functionally integrated.

RE 70 includes instructions for one or more routing protocols 74. Routing protocols 74 include any or all of interior gateway routing protocols such as open shortest path first (OSPF), intermediate system to intermediate system (IS-IS), routing information protocol (RIP), interior gateway routing protocol (IGRP), enhanced IGRP (EIGRP), and/or exterior gateway routing protocols, such as border gateway protocol (BGP). In general, interior gateway routing protocols are used to exchange routing information between routers of an autonomous system. Routing protocols 74 further include protocols related to network tunneling, such as MPLS, label distribution protocol (LDP), resource reservation protocol traffic engineering (RSVP-TE), or other protocols.

In general, RE 70 executes routing protocols 74 to determine routes between network devices, e.g., routes from router 50 to other network devices. Other routers coupled to router 50 via IFCs 90 advertise routes to router 50. When router 50 receives a communication from another router that advertises a new route, RE 70 receives the communication and stores the new route in routing information 42 (also referred to as a routing information base). RE 70 also executes routing protocols 74 to prioritize routes from router 50 to a destination. That is, when routing information 42 includes information indicating that multiple routes exist to a common destination, RE 70 executes routing protocols 74 to select one of the routes to reach the destination.

The selected route to reach the destination generally includes an indication of a "next hop" along the route to reach the destination. This next hop typically corresponds to a network device, such as, for example, another router, switch, gateway, or other network device along the route to reach the destination. The next hop device is connected to router 50 via one of IFCs 90. Accordingly, using the selected route to reach a destination, control unit 52 can determine the one of IFCs 90 connected to the next hop along the route to the destination and update forwarding information stored by PFE 60 to indicate the one of IFCs 90 to which to send packets destined for the destination.

More specifically, PFE 60 maintains forwarding information base (FIB) 62. Then, in response to receiving information from routing engine 40, PFE 60 updates FIB 62 to map a destination address to one of IFCs 90, based on the next hop along the route to reach the destination address. FIB 62 also includes information indicating how to forward packets associated with a network tunnel, e.g., packets having one or more labels and/or packets to which to append one or more labels.

When router 50 operates as an ingress router for a tunnel (e.g., an LSP), router 50 receives a packet via one of inbound links 92 for one of IFCs 90. In general, IFCs 90 are configured to send such a packet to forwarding engine 60. Forwarding engine 60 determines the source device from which the packet was received based on the one of IFCs 90 that received the packet and the port of the one of IFCs 90 that received the packet. In some examples, forwarding engine 60 also determines the destination of the packet. In any case, forwarding engine 60 determines, using forwarding information 62, that the packet is to be tunneled, and therefore, sends the packet to monitoring unit 80. It should be understood that router 50 may also be configured to receive and process conventional network packets, e.g., packets not associated with a tunnel or packets not subject to load balancing decisions.

Monitoring unit 80 includes label data 82, label handler 84, entropy label handler 86, and flow record data 88. Label data 82 represents data for labels that can be appended to a received packet, as well as data for handling a packet having labels already appended. For example, when router 50 operates as an ingress router for a tunnel, label handler 84 receives the packet and determines a tunnel on which the packet is to be sent. Label handler 84 also determines, based on information received for the packet, a pair of edge routers for the packet and network layer services to be applied to the packet. Label handler 84 then determines, using label data 82, labels representing the pair of edge routers (e.g., an application label such as a Virtual Private Network (VPN) label), the network layer services, and a tunnel label representative of the next hop along the tunnel.

Entropy label handler 86, in accordance with the techniques of this disclosure, determines whether a label stack includes an entropy label identifier and an entropy label, removes the entropy label identifier and entropy label in certain circumstances, adds the entropy label identifier and entropy label in other cases, and moves the entropy label identifier and entropy label up or down in the label stack in still other cases. To determine appropriate label handling behavior, monitoring unit 80 determines whether router 50 is positioned between two routers of an end-to-end LSP or is an edge router of the end-to-end LSP.

To illustrate by way of a LSP tunnel as an example end-to-end path, when monitoring unit 80 determines that a packet of the LSP tunnel (e.g., LSP 16 of FIG. 1) is received from a source device, that is received at an ingress router, and that is destined for a destination device, monitoring unit 80 determines that an entropy label should be added to a label stack for the packet. Thus, entropy label handler 86 computes the entropy label (e.g., from attributes of the packet header such as 5-tuple) and adds an entropy label indicator and an entropy label to the label stack for the packet. This may occur after label handler 84 removes an incoming tunnel label, and before label handler 84 adds an outgoing tunnel label for the next hop. Label handler 84 may remove from or add to the packet's label stack an application label (if present) representative of a network service (e.g., a Virtual Private Network (VPN)) of router 50 and/or the destination device. Monitoring unit 80 generates a flow record for the packet's corresponding network flow and adds that flow record to flow record data 88 with an index key set to the entropy label or, as an alternative, with a value (e.g., a hash value) computed from one or more packet header attributes used for computing the entropy label.

In response to receiving the packet, monitoring unit 80 exports the attributes used to compute the entropy label and the flow record from flow record data 88 to the controller where the flow record is combined with other flow records with the entropy label corresponding to the same network flow. When subsequent packets arrive at router 50, monitoring unit 80 repeats the generation and exportation of flow record data 88 to the controller. In some examples, monitoring unit 80 updates flow record data 88 after each packet and then, exports updated flow record data 88 to the controller.

As described herein, the controller leverages the entropy label in the exported flow record to identify the other flow records and quickly collate the disparate flow information that has been collected over time. In effect, the entropy label operates as an index key that facilitates end-to-end monitoring (e.g., of flow records) for the packet's corresponding network flow. Because the entropy label is unique, the index key for identifying the flow record is unique and therefore, configured to distinguish the flow record from other flow records in flow record data 88. In addition, router 50 may communicate the flow record to a controller and in turn, the controller receives the flow record and uses the index key to identify the particular network flow. The controller may use the index key to store the flow record in an arrangement of other flow records for a plurality of network flows.

When monitoring unit 80 determines that a packet of the above LSP is received from an ingress router and is destined for another router in the LSP tunnel to a destination device (e.g., a transit router or an egress router), monitoring unit 80 determines that any entropy label in a label stack of the packet should be maintained and used to identify any flow record to be exported to the controller. When router 50 operates as a penultimate hop popping (PHP) router and an egress router is a next hop in the LSP, monitoring unit 80 configures router 50 to not remove the entropy label. This may occur after label handler 84 removes an incoming tunnel label for the packet, and before label handler 84 adds an outgoing tunnel label for the packet. Label data 82 indicates that the incoming tunnel label maps to the LSP and forwarding information 62 indicates a next hop, which is a next network device (e.g., router) in the LSP, corresponding to the outgoing tunnel label. Monitoring unit 80 generates a flow record for the packet's corresponding network flow and adds that flow record to flow record data 88. Monitoring unit 80 also sends the flow record to the controller where the controller adds the flow record to an arrangement of flow records for each and every network flow. To facilitate end-to-end monitoring for a particular network flow that corresponds to the packet, monitoring unit 80 generates the flow record to include the entropy label. It should be noted that the monitoring unit 80 does not have to include the entropy label if the controller is configured to compute the entropy label (or another index key) from one or more attributes in the packet.

When monitoring unit 80 determines that a packet of the above LSP is received at an egress router, which may be entropy label capable or entropy label incapable, and is destined for a destination device (e.g., in another network which may not be entropy label capable), monitoring unit 80 determines that entropy labels in a label stack of the packet should be removed. Thus, entropy label handler 86 inspects the label stack of the packet to determine whether the label stack includes an entropy label indicator and an entropy label. If the label stack includes an entropy label indicator and an entropy label, entropy label handler 86 removes the entropy label indicator and entropy label. This may occur after label handler 84 removes an incoming tunnel label for the packet, and before label handler 84 adds an outgoing tunnel label for the packet. The egress router also receives a label on a top of the label stack and that label represents a network service (e.g., a network layer service, a transport layer service, and/or the like) for the destination device or a (destination) network (e.g., MPLS application, such as an IP Virtual Private Network (VPN), a MPLS Layer 3 VPN (L3VPN), or Virtual Private LAN Service (VPLS)) having the destination device. An example label may be a per-prefix L3VPN label that enables the packet to originate at a source device in a first network (e.g., segment), be received at an edge router (e.g., the ingress router) at a second network, and be directed to a destination device in a third network identified by the per-prefix L3VPN label.

In the above example, to facilitate end-to-end monitoring for a particular network flow that corresponds to the packet, monitoring unit 80 repurposes the entropy label for a particular network flow's flow record. Monitoring unit 80 may generate the flow record to include the entropy label and then, export the flow record to the controller where flow records for a plurality of network flows are processed and arranged into a database. By doing so, the controller may identify the particular network flow upon receiving the flow record. The entropy label operates as a unique identifier for the particular network flow such that the controller may distinguish flow records for the particular network flow amongst a plurality of flow records of other network flows. The controller may leverage the entropy label to build an index (e.g., a database) as an arrangement of flow records where the entropy label operates as an index key. The controller may store the flow record in the index and use flow record's entropy label to properly insert the flow record into the arrangement. Other portions of the flow record may specify information such as a number of packets in the particular network flow. Monitoring unit 80 may generate the entropy label based on one or more of various attributes describing packets of the particular network flow (e.g., packet header attributes including network addresses and port numbers for source and destination devices, outgoing interface, a protocol type, and/or the like). As an alternative, monitoring unit 80 computes a different value to operate as the index key for distinguishing the flow record from flow record of other network flows. Monitoring unit 80 may use one or more packet header attributes to generate the entropy label and one or more different packet header attributes to compute the value for the alternative index key. In turn, when the controller receives the flow record, the controller uses either the same set of attributes to compute the entropy label or the value to use as alternative the index key. The controller may repurpose the entropy label as described herein even if the entropy label is not being used for load balancing decisions (e.g., label-based load balancing).

Figure 3:
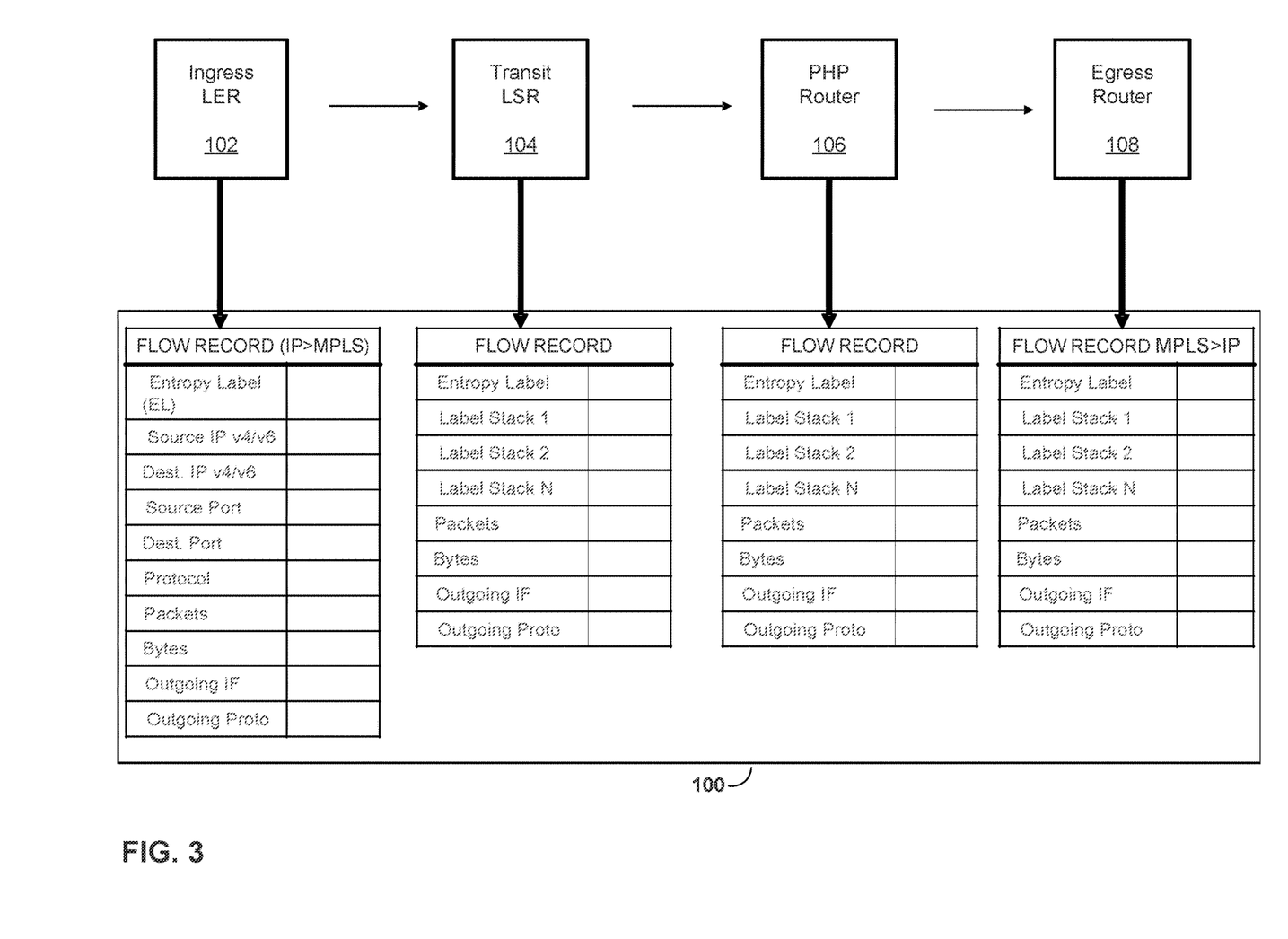
FIG. 3 is a conceptual diagram illustrating end-to-end flow monitoring and flow record management.

FIG. 3 is a conceptual diagram illustrating end-to-end flow monitoring and flow record management by controller 100 of a network. Routers 102, 104, 106, 108 comprise at least a portion of the network's routers. Each router in the network communicates flow records in response to receiving packet data corresponding to network flows.

Controller may be an SDN controller that enables granular visibility and control of IP/MPLS tunnels in large service provider and enterprise networks. Network operators can use controller 100 to optimize their network infrastructure through proactive monitoring, planning, and explicit routing of large traffic loads dynamically based on entropy label-based load balancing.

Assuming routers 102, 104, 106, 108 form a tunnel (e.g., an LDP or intra-autonomous system tunnel), packet data for any network flow mapped to this tunnel is communicated along routers 102, 104, 106, 108. If label-based load balancing is employed, an entropy label may ensure the communication of the packet data along the same sequence of routers 102, 104, 106, 108. Initially, ingress Label Edge Router (LER) 102 receives the packet data and in response to determining that the packet data belongs to a new network flow, generates a flow record to include the entropy label and/or data indicating one or more attributes for computing the entropy label. Ingress LER 102 sends to controller 100 the data indicating the one or more attributes used for computing the entropy label to enable controller 100 to identify a particular flow based on the entropy label and to perform flow monitoring on end-to-end paths such as LSP 16 of FIG. 1. Receiving the one or more attributes prompts controller 100 to register the one or more attributes as key information for a new network flow with Ingress LER 102, an incoming/outgoing protocol, and an outgoing interface (e.g., an MPLS network). As described herein, the one or more attributes describe packets for the new network flow and may be stored in any packet header. To support the controller's flow monitoring operations, Ingress LER 102 sends the flow record with the entropy label and any other flow information.

To prepare an example packet for forwarding along the label switched path (or another example end-to end path), Ingress LER 102 may add, to a label stack of the packet data, the entropy label and at least one label (e.g., tunnel label) for forwarding the packet data along the tunnel. Then, Ingress LER 102 sends to a next hop identified by the label stack, which in this example is transit Label Switching Router (LSR) 104. If Ingress LER 102 may employ a load balancing mechanism to calculate a hash value (e.g., an entropy label) of the packet data, including the one or more attributes located in the packet header, and determine a path for packets of the network flow based on the hash value. The entropy label may be based on the hash value and/or another value. Ingress LER 102 forwards the above packets to a device known as the next hop along the determined path.

In response to receiving the packet data including the entropy label, transit LSR 104 also generates a flow record that may include, in some examples, different data than other flow records. As such, the flow record from transit LSR 104 may be considered a copy or version of the flow record. Transit LSR 104 proceeds to send, to controller 100, the flow record (e.g., transport labels, application-specific labels, outgoing interface, protocol, etc.) including the entropy label. In some examples, transit LSR 104 may also export additional information associated with the flow record such as the number of packets, number of bytes, etc. Similar, Penultimate Hop Popping (PHP) Router 106 receives the packet data and then, generates a copy or version of the flow record for export to controller 100. In this example, PHP router 106 does not remove the entropy label and is configured to retain the entropy label on the label stack.

Finally, egress router 108 receives the packet data and then, generates a copy or version of the flow record for export to controller 100. Egress router 108 removes the entropy label and uses the outgoing protocol (e.g., IP) and outgoing interface to forward the packet to the destination.

Although the packet of the network flow is forwarded from ingress LER 102 to egress router 108, egress router 108 may propagate, in a reverse direction, various data. In accordance with a signaling protocol, egress router 108 may communicate to upstream routers a signaling message indicating a capability or a requirement at that router, and one example signaling message indicates whether or not egress router 108 is entropy label capable. Transit LSR 104 or PHP router 106 may also send signals upstream including the example signal indicating that transit LSR 104 or PHP router 106, respectively, is entropy label capable or is entropy label incapable. Ingress LER 102 may communicate signals to the source device which may be in a same network (e.g., segment) or in a different network.

If egress router 108 is an egress of an LDP tunnel as an example of the above mentioned tunnel, egress router 108 may signal upstream labels (e.g., tunnel labels) representative of each hop in that LDP tunnel. Hence, PHP router 106 receives a set of labels including a label for each of ingress LER 102, transit LSR 104, PHP router 106, and egress router 108 and before propagating to transit LSR 104 the set of labels, PHP router 106 removes the label for egress router 108 and retains it in available label data (e.g., label data 82). Transit LSR 104, in a similar fashion, retains a label for PHP router 106 and propagates upstream a label for itself to ingress LER 102. If needed, ingress LER 102 may remove the label for transit LSR 104. When a packet of the network flow arrives at a source device and is to be transmitted along the LDP tunnel, the source device identifies ingress LER 102 as a neighboring router and an ingress to an end-to-end path to the destination device.

When the packet along the LDP tunnel arrives, ingress LER 102 may add to the packet's label stack the entropy label and the label for Transit LSR 104 and then, send the packet further along the LDP tunnel. Similarly, when the packet along the LDP tunnel arrives at transit LSR 104, that router may replace a label at top of the label stack with the label for a next ho, which may be another transit LSR 104 or PHP router 106. When the packet along the LDP tunnel arrives at PHP router 106, that router may replace a label at top of the label stack with the label for egress router 108.

Figure 4:
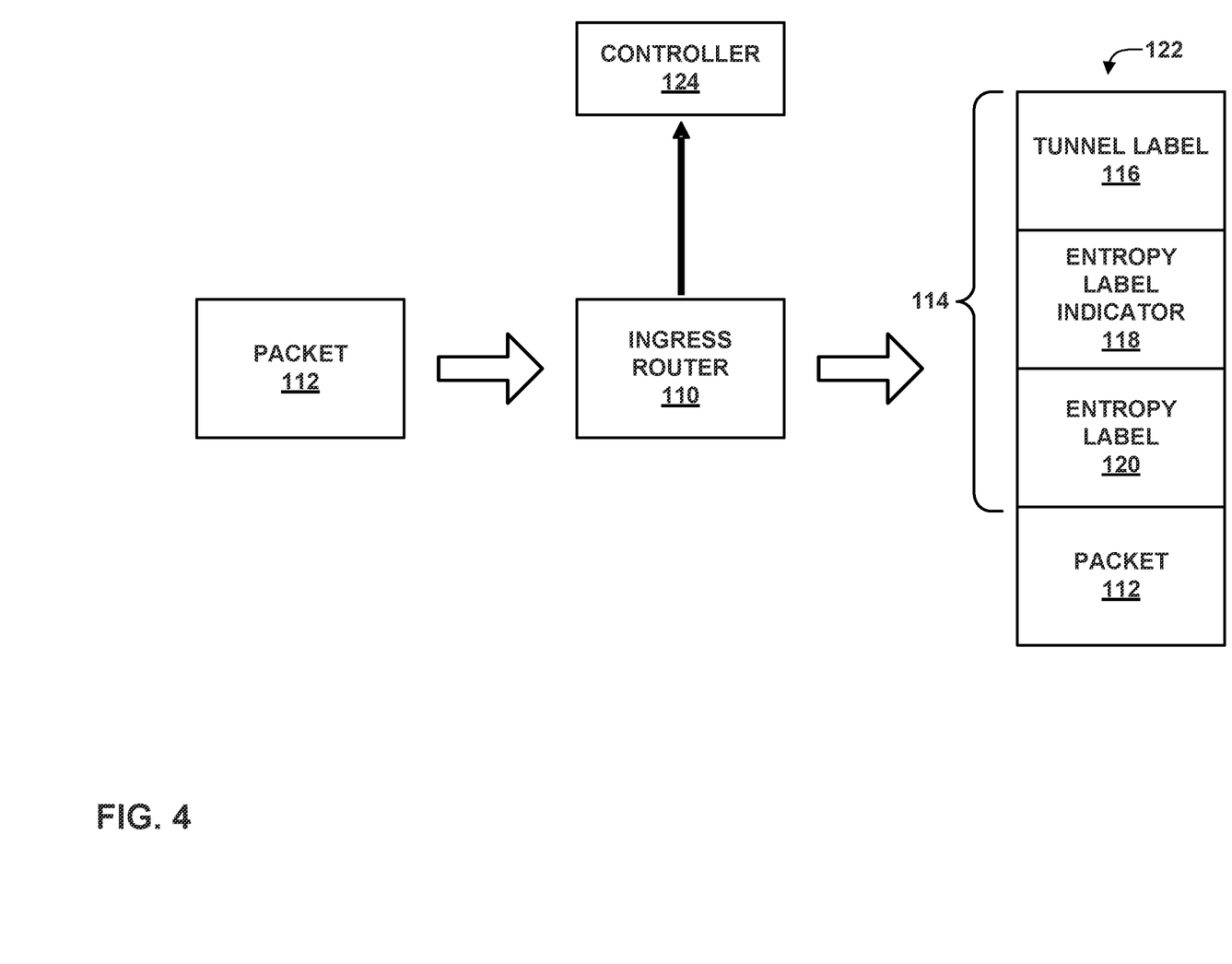
FIG. 4 is a conceptual diagram illustrating an example encapsulated packet that an ingress router modifies to add an entropy label.

FIG. 4 is a conceptual diagram illustrating an example packet 112 that an ingress router 110 receives and modifies to add entropy label 120. Ingress router 110 may represent an example implementation of router 20 of FIG. 1 and/or ingress LER 102 of FIG. 3. Ingress router 110 may receive packet 112 from a source device. Alternatively, ingress router 110 may receive an encapsulated packet having packet 112 (e.g., as an inner packet) from either an entropy label capable segment or a non-entropy label capable segment of an end-to-end LSP.

In example packet 112, packet data includes a packet header and payload of application data. Attributes with the packet data (e.g., from the packet header) may describe a network flow corresponding to packet 112 and an end-to-end path between a source device and a destination device. Ingress router 110 may generate entropy label 120 based on one or attributes within the packet data (e.g., the packet header) and then, send the attributes used to compute the entropy label 120 and a flow record identified by the entropy label 120 to controller 124 to facilitate end-to-end flow monitoring.

Ingress router 110 may add entropy label indicator 118 and entropy label 120 to packet data in packet 112 if ingress router 110 is entropy label capable. Based on forwarding information for the tunnel, ingress router 110 adds tunnel label 116, which corresponds to a next hop in the tunnel, to label stack 114 of modified encapsulated packet 112. Thus, label stack 114 includes tunnel label 116. In some examples, tunnel label 116 is representative of the autonomous system encompassing ingress router 110 and between a source device and a destination device of example packet 112. Within that same autonomous system, ingress router 110 and at least one other router may form a tunnel (e.g., an LDP tunnel) where each router may be assigned a representative tunnel label.

Thus, the encapsulated packet 122 is encapsulated by label stack 114, which includes an entropy label indicator and an entropy label. As an option, ingress router, before adding entropy label indicator 118 and entropy label 120, may add application label to represent a MPLS application (e.g., VPN) of the destination device.

In general, label-based load balancing involves selecting keys for a load-balancing function that selects a path for a (new) network flow and acceptable keys may be selected from packet data attributes (e.g., application-specific attributes, such as VPN-specific attributes) for the network flow; an example set of keys includes source and destination network addresses (e.g., IP addresses for IP packets), a protocol type, and (e.g., for TCP and UDP traffic) the source and destination port numbers. In one example, ingress router 110 uses the load balancing function to generate entropy label 120 from the example set of keys and then, repurpose entropy label 120 for end-to-end flow monitoring as describe herein.

Adding entropy label 120 ensures downstream transit routers forward packets belonging to the same network flow because, in effect entropy label 120 is mapped to a same path (e.g., a same exact sequence of routers across the network such as the LDP tunnel). Example device, systems, and techniques, as described in the present disclosure, leverage entropy label 120 to ensure that each downstream router receiving encapsulated packets generates flow record data using a same index key and to export the flow record to the controller. Some examples may use a copy of at least a portion of entropy label 120 while other examples may use another value (e.g., a hash value) based on entropy label 120 or based on one or more of the above mentioned example set of keys. Ingress router 110 may generate the index key from one or more attributes of the packet data attributes (e.g., application-specific attributes).

Figure 5:
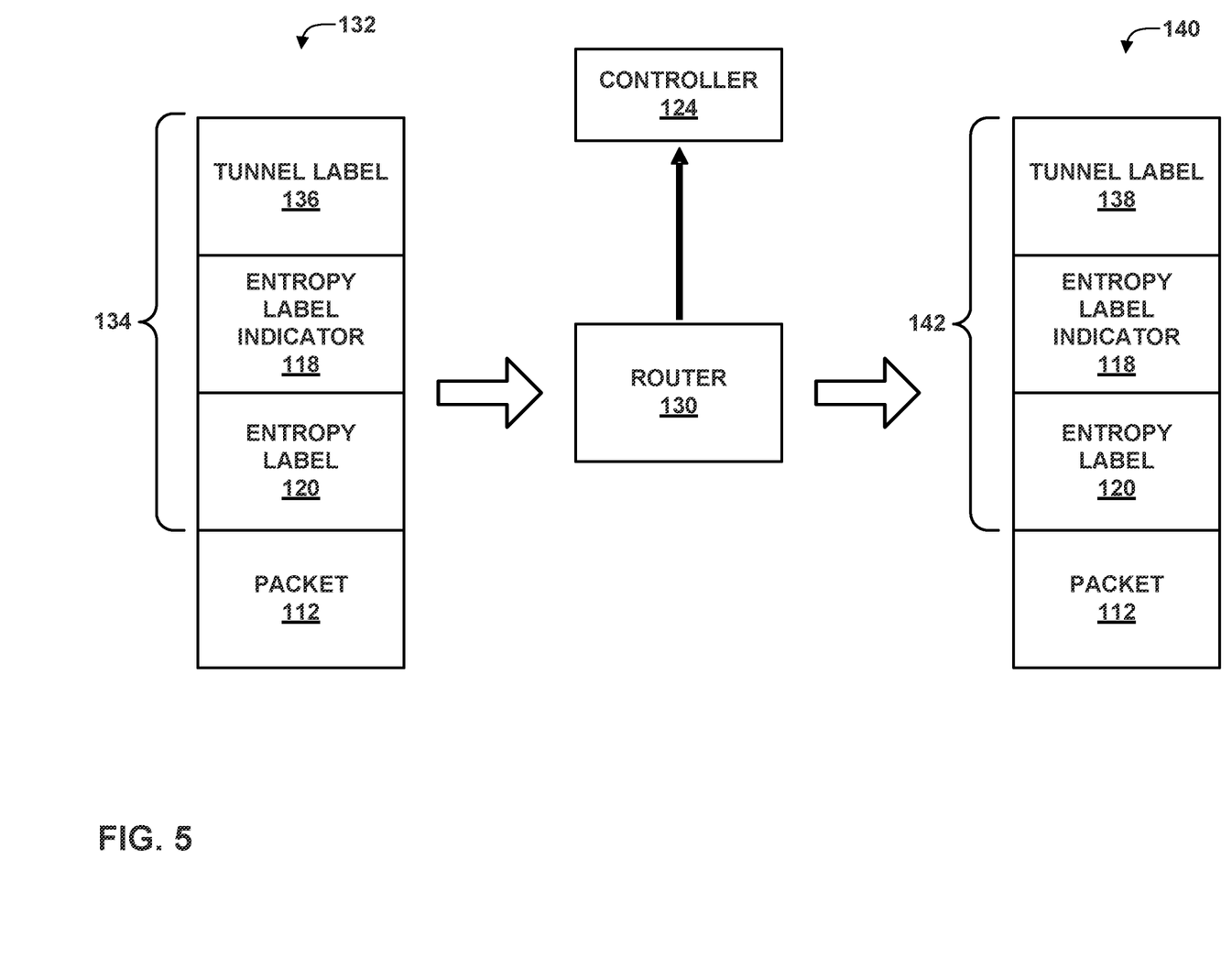
FIG. 5 is a conceptual diagram illustrating an example encapsulated packet that a router received and forwarded to a next router.

FIG. 5 is a conceptual diagram illustrating an example encapsulated packet 132 that router 130 received and forwarded to a next router. Router 130 may represent an example implementation of any of routers 22, 24, 26, 28, 30 of FIG. 1 and/or routers 104, 106 of FIG. 3. In some examples, router 130 receives encapsulated packet 132 from an ingress router (or previous hop transit router) and outputs modified encapsulated packet 140 to the next router, such as a transit router or an egress router of a same tunnel. In the example of FIG. 5, encapsulated packet 132 includes packet 112 that is encapsulated by label stack 134. Label stack 134 includes tunnel label 136, entropy label indicator 118, and entropy label 120.

Based on an identification of a next hop in a tunnel corresponding to tunnel label 136, router 130 removes tunnel label 136 from label stack 134 and adds tunnel label 138, which is representative of the next hop, to produce modified encapsulated packet 140 with modified label stack 142. In other examples, such as in segment routing, the router may pop off the outer label and forward the packet to the next label in the tunnel label stack. Assuming the next hop is entropy label capable, entropy label 120 ensures that the next hop transmits packet 112 along the above-mentioned tunnel. If the next hop is not entropy label capable, the next hop may transmit packet 112 along a different path, ignoring entropy label 120, while still providing controller 124 with a flow record for the corresponding network flow for encapsulated packet 132. The flow record may include an index key based on entropy label 120. In either case, router 130 may operate as a transit/penultimate hop popping router and generate the flow record for exportation with the entropy label 120 to controller 124.

Figure 6:
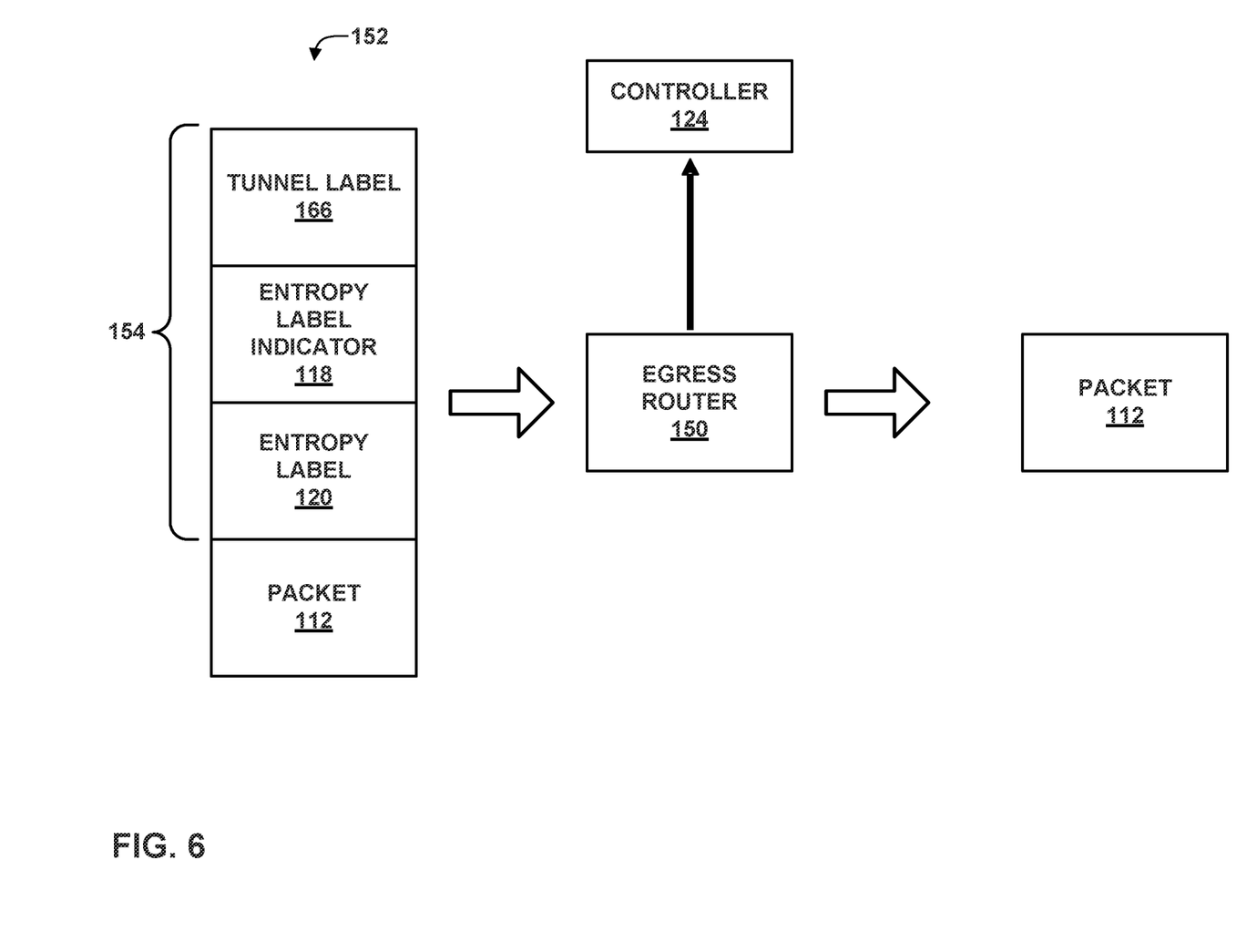
FIG. 6 is a conceptual diagram illustrating an example encapsulated packet that is received by an egress router of an LSP and is to be output to a destination device of the LSP.

FIG. 6 is a conceptual diagram illustrating an example encapsulated packet 152 that is received by egress router 150 of an end-to-end LSP and is to be output to a destination device of the LSP. Router 150 may represent an example implementation of router 32 of FIG. 1 and/or egress router 108 of FIG. 3.

In this example, encapsulated packet 152 includes packet 112 and label stack 154. Packet 112 may be known as an inner packet of encapsulated packet 152. Label stack 154 includes tunnel label 156, entropy label indicator 118, and entropy label 120. Egress router 150, which may include components similar to those of router 50 illustrated in FIG. 2, may modify (e.g., decapsulate) encapsulated packet 152 in accordance with the techniques of this disclosure.

Example encapsulated packet 152 may be received from a router within a same network and is to be output to the destination device of the LSP tunnel also within the same network. Hence, the LSP tunnel may be an intra-Autonomous System (AS) tunnel. Prior to delivering encapsulated packet 152 to the destination device, egress router 150 may modify (e.g., decapsulate) that packet by removing tunnel label 156, entropy label indicator 118, and entropy label 120 and then, send packet 112 based on the outgoing protocol and outgoing interface. By communicating the above modified packet data to the destination device (or another router in a second network), egress router 152 complies with the label-based load balancing scheme (per RFC 6790) and may prevent errors downstream.

To facilitate end-to-end monitoring of the network flow, egress router 150, like other routers in same network, may be configured to export the flow record and entropy label 120 to controller 124. In accordance with devices, systems, and techniques described herein, controller 124, like egress router 150 and other routers in same network, generates an index key for the flow record using the same above-mentioned set of attributes that were used in computing entropy label 120. Each router sends the controller a flow record having the same index key, allowing controller 124 to identify the flow record amongst flow records of other network flows.

It should be understood that additional labels may be included in label stack 154 that are not shown in FIG. 6. Similarly, in the examples of FIGS. 4 and 5 as discussed herein, the full label stack is not necessarily illustrated in the figures.

Figure 7:
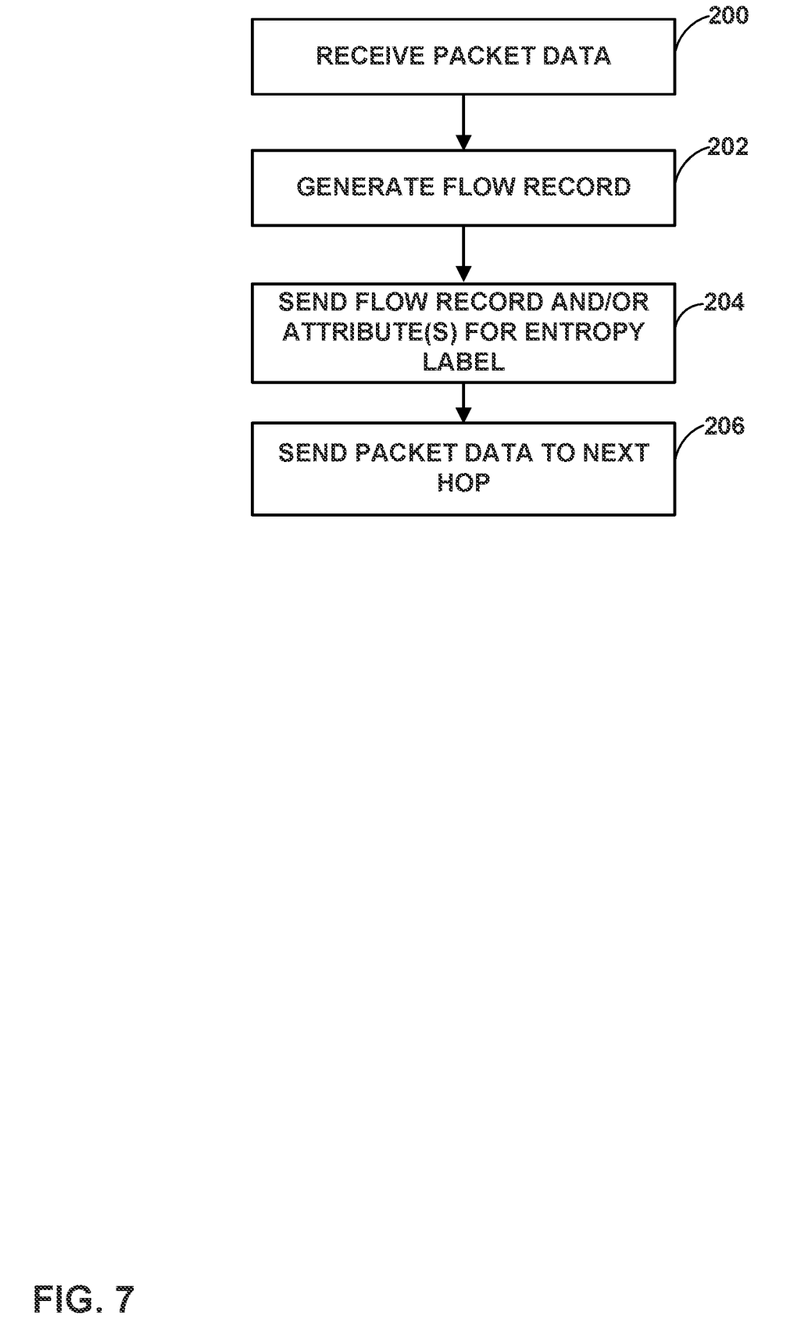
FIG. 7 is a flow diagram illustrating an example method for computing an entropy label to use as a key for flow records corresponding to a same flow.

FIG. 7 is a flow diagram illustrating an example method for computing an entropy label to use as an index key for flow records corresponding to a same flow.

The method of FIG. 7 may be performed by any of routing network devices described above, which may be an ingress router, a transit router, or an egress router. For purposes of example, the method of FIG. 7 is described with respect to router 50 of FIG. 2.

Initially, router 50 receives packet data (or simply a packet) of a network flow (200). If router 50 operates as the ingress router, the packet data is received from a source device or an edge router in a different network, such as a non-entropy label capable (ELC) segment of an end-to-end LSP. If router 50 operates as the transit router or the egress router, router 50 may receive the packet data from another router in the same network, such as the ingress router or previous hop transit router.

Router 50 may then generate a flow record for a corresponding network flow of the packet data (202). When router 50 receives the packet data, router 50 may be triggered into determining that the packet data corresponds to a new network flow and generating a new flow record identified by an entropy label. Router 50 may generate a flow record to include, for example, the following: the entropy label (as a primary key to identify the flow record); a protocol, an outgoing interface, and information associated with the packet flow. Example information associated with the packet flow may include MPLS header information (e.g., labels including tunnel label, application-specific label, etc.) and other information in the label stack.

Router 50 may then send to a controller the flow record (204). If router 50 is an ingress router, router 50 may also send the attribute(s) used for computing the entropy label. In addition to the entropy label and the flow record, it is more important that the controller receives information identifying which attribute(s) (e.g., packet header attribute(s)) may be used for computing the entropy label and identifying the flow record. By doing so, the controller may distinguish the flow record for the packet data's network flow from flow records of other network flows.

Router 50 may then send the packet data to a next hop (206). Assuming router 50 implements label-based forwarding, router 50 may pop or remove a top label of a label stack in the packet data and using forwarding information, identify the next hop that maps to the top label. The next hop may be a network device along a same tunnel as router 50 and as such, may be assigned a tunnel label. In other examples, the next hop may be a network device that maps to a different tunnel than router 50 and assigned a corresponding tunnel label or to no tunnel at all and assigned a generic label, both of which map to the same next hop network device. Router 50 adds the appropriate label unless router 50 operates as the egress router in which instance router 50 does not add any label before sending the packet data to the next hop.

Figure 8:
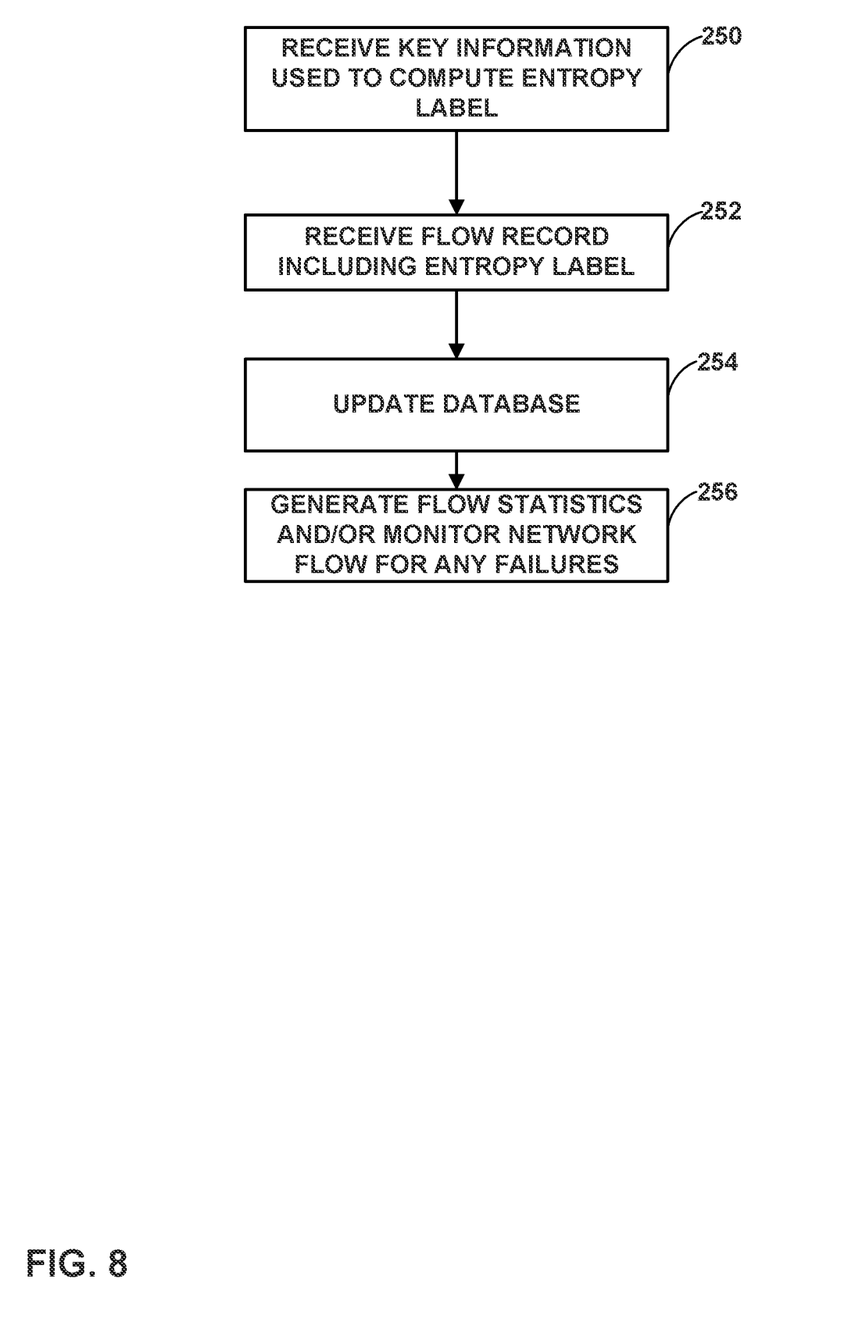
FIG. 8 is a flow diagram illustrating an example method executed by a controller in a network that provides end-to-end flow monitoring.

FIG. 8 is a flow diagram illustrating an example method executed by a controller in a network that provides end-to-end flow monitoring. For purposes of example, the method of FIG. 8 is described with respect to controller 100 of FIG. 3.

Initially, controller 100 receives (e.g., from an ingress router) key information of a new network flow (250). In some examples, the key information operates as a set of hash keys for computing a new entropy label in accordance with label-based load balancing scheme (per RFC 6790). For example, controller 100 receives key information used to compute the entropy label from an ingress router of the network flow. Regardless of whether or not the entropy label is actually used in multi-pathing, controller 100 repurposes the entropy label for use in identifying flow records for the new network flow. Hence, the entropy label may be computed from key information including only one attribute or as many attributes specified by the label-based load balancing scheme (per RFC 6790).

Controller 100 receives flow records from routers in the network and uses the entropy label to distinguish the flow records of the new network flow (252). This is enabled by routers in the network generating flow records that include the entropy label corresponding to the new network flow. In some examples, the routers in the network may generate flow records by inserting, into a flow record template, a label stack from an incoming packet of the new network flow. If controller 100 suspects that the packet or the entropy label itself has been being compromised, controller 100 may use key information to verify the entropy label in the label stack. In other examples, the routers in the network may generate flow records without including the entropy label used for load balancing.

Controller 100 then updates a database (e.g., an index) to store the received flow records of the new network flow (254). Controller 100 may then proceed to generate flow statistics and/or monitor the network flow for any failures (256). Those skilled in related art may use flow statistics (e.g., NetFlow statistics) in various network management tasks. Flow statistics are useful for several applications such as Network Monitoring. Flow statistics can also be used to measure how application and policy changes affect flow traffic.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

The invention claimed is:

1. A network device comprising:
   processing circuitry configured to:
   receive packet data corresponding to a network flow originating at a first device, the packet data destined to a second device;
   generate an entropy label to add to a label stack of the packet data, wherein the entropy label is generated from one or more attributes corresponding to the network flow that originated at the first device and is destined to the second device;
   generate a flow record including the entropy label, wherein the entropy label identifies the network flow amongst a plurality of network flows in a network; and
   in response to the generation of the flow record, send, to a controller of the network, the flow record, wherein the controller identifies, based on the entropy label, each device corresponding to the network flow originating at the first device and is destined to the second device.

2. The network device of claim 1, wherein to generate the flow record, the processing circuitry is further configured to include an outgoing interface and an outgoing protocol in the flow record.

3. The network device of claim 1, wherein to generate the entropy label, the processing circuitry is further configured to generate the entropy label from one or more packet header attributes in the packet data.

4. The network device of claim 1, wherein the entropy label is an index key to identify the flow record amongst a plurality of flow records for the plurality of network flows in the network.

5. The network device of claim 1, wherein the processing circuitry is further configured to send, to the controller of the network, the one or more attributes used to generate the entropy label.

6. The network device of claim 1, wherein the processing circuitry is further configured to receive, from an egress router, a signaling message indicating that the egress router is configured to be entropy label capable or entropy label incapable.

7. A network device comprising:
processing circuitry configured to:
receive packet data corresponding to a network flow originating at a first device and is destined to a second device in a network, the packet data comprising an entropy label for the network flow and a label stack for directing the packet data to the second device through at least one of a plurality of network devices of the network; and
in response to receiving the packet data:
generate a flow record including the entropy label, wherein the label stack of the packet data comprises the entropy label to identify the network flow amongst a plurality of network flows in the network; and
send, to a controller of the network, the flow record, wherein the controller identifies, based on the entropy label, each device corresponding to the network flow originating at the first device and destined to the second device.

8. The network device of claim 7, wherein the network device is a transit router, wherein the processing circuitry is further configured to:
generate, in response to receiving the packet data including the entropy label, the flow record including the entropy label of the label stack, an outgoing interface, and a protocol specified in the packet data.

9. The network device of claim 7, wherein the network device is a transit router, wherein the processing circuitry is further configured to:
send, via an outgoing interface to a next hop, the packet data to a router that corresponds to the next hop.

10. The network device of claim 7, wherein the network device is a transit router, wherein to send the flow record to the controller, the processing circuitry is configured to send the label stack as a portion of the flow record.

11. The network device of claim 7, wherein the network device is a penultimate hop popping router, wherein the processing circuitry is further configured to retain the entropy label on the label stack when communicating the packet data to an egress router.

12. The network device of claim 7, wherein the network device is an egress router, wherein the processing circuitry is further configured to:
receive, from a penultimate hop popping router, the packet data having the entropy label on the label stack;
remove, from the label stack of the packet data, the entropy label to generate modified packet data; and
communicate, to a router in a second network or the second device, the modified packet data.

13. The network device of claim 12, wherein to communicate the modified packet data, the processing circuitry is configured to communicate the modified packet data using an outgoing interface and protocol specified in the modified packet data.

14. The network device of claim 7, wherein the processing circuitry is further configured to communicate, to an ingress router, a signaling message indicating that the egress router is configured to be entropy label capable or entropy label incapable.

15. A controller comprising:
processing circuitry configured to:
maintain an index storing an arrangement of flow records for a plurality of network flows through a network, wherein for one or more corresponding flow records of a particular network flow of the plurality of network flows, an index key is based on an entropy label corresponding to the particular network flow, wherein each of a plurality of entropy labels identifies a respective one of the plurality of network flows;
receive, from a network device in the network, one or more attributes corresponding to a new entropy label for packet data of a new network flow in the network, wherein the new entropy label identifies each network device along a path for the new network flow; and
generate, based on the new entropy label, a new index key for at least one flow record corresponding to the new network flow to be added to the index.

16. The controller of claim 15, wherein the processing circuitry is further configured to:
receive respective flow records from network devices forwarding the packet data of the new network flow between a first device and a second device.

17. The controller of claim 15, wherein the processing circuitry is further configured to:
receive, from an ingress router, one or more packet header attributes used to generate the entropy label for the particular network flow; and
receive, from the ingress router, a flow record including the entropy label as an index key for the flow record.

18. The controller of claim 15, wherein the processing circuitry is further configured to:
generate network flow statistics for each respective one of the plurality of network flows.

19. The controller of claim 15, wherein the processing circuitry is further configured to:
receive, from at least one of a transit router, a penultimate hop popping router, or an egress router, a copy of a label stack for the packet data and updated flow information for the new network flow.

20. The controller of claim 15, wherein the processing circuitry is further configured to:
determine an error corresponding to an end-to-end path of the new network flow of the plurality of network flows.

* * * * *